L. A. WESTIN.
OVERLOAD UNCOUPLING COUPLING.
APPLICATION FILED OCT. 1, 1912.

1,091,449.

Patented Mar. 24, 1914.

WITNESSES:
Jos H Collins
Edwin Frey

INVENTOR
LOUIS A. WESTIN

BY Joseph J. O'Brien
Attorney

UNITED STATES PATENT OFFICE.

LOUIS ARTHUR WESTIN, OF CUMBERLAND, WISCONSIN.

OVERLOAD UNCOUPLING COUPLING.

1,091,449.  Specification of Letters Patent.  Patented Mar. 24, 1914.

Application filed October 1, 1912. Serial No. 723,277.

*To all whom it may concern:*

Be it known that I, LOUIS ARTHUR WESTIN, a citizen of the United States, residing at Cumberland, in the county of Barron and State of Wisconsin, have invented certain new and useful Improvements in Overload Uncoupling Couplers, of which the following is a specification.

This invention relates to a device for disconnecting or uncoupling a hauling element from a hauled element, such as a traction engine from a plow, when an overload is placed on the hauled element, or plow.

One of the leading objects of the invention is the provision of a device supplementing the usual coupling connection, which will easily and positively release a plow coupled to a traction engine, when the plow encounters an obstruction, such as a stump or boulder, or when an overload is placed on the traction engine by reason of increased resistance, due to the obstruction of a stump, boulder or other cause.

Another object of the invention is the provision of a device of this character, which will enable the operator of the plow, or other device on which the invention is applied, to easily couple the plow when uncoupled, yet which will uncouple only under an abnormal over load or abnormal obstruction or resistance.

A still further object of the invention is the provision of a device which will positively lock a plow or other implement or element to be hauled to a tractor so that accidental uncoupling will be prevented and instant uncoupling under an abnormal load will be secured.

A still further object of the invention is the provision of a coupling device which is adjustable so that disruption of the coupling parts will be effected under various overloads.

With the above and other objects in view the invention comprises certain objects further developed in this specification, and certain combinations, constructions and arrangements of parts, clearly described in this specification and clearly illustrated in the accompanying drawings, in which—

Figure 1:
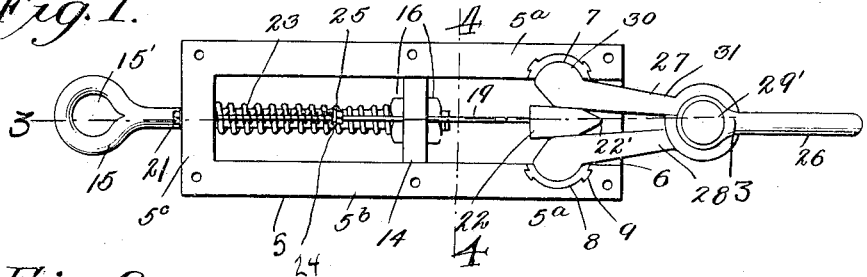
Figure 2:
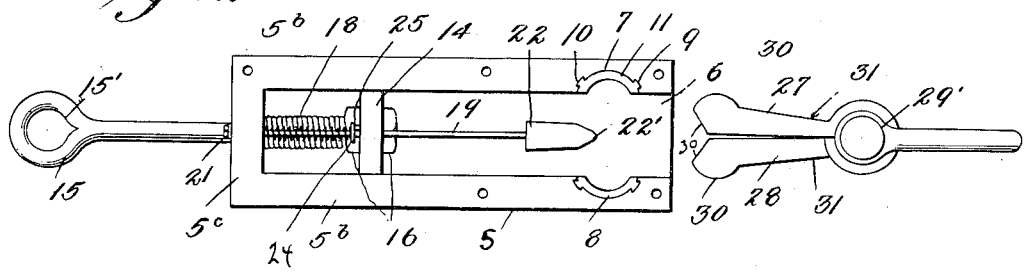
Figure 3:
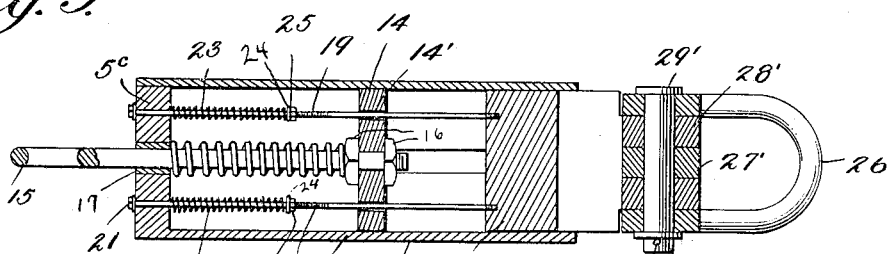
Figure 4:
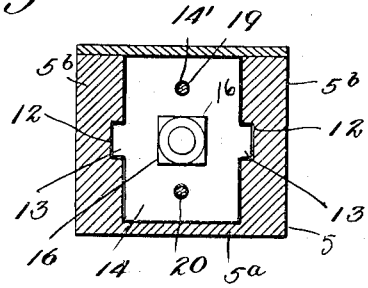
Figure 5:
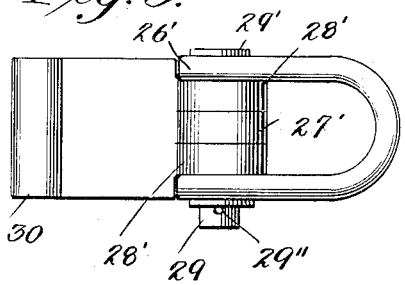

Figure 1 is a top plan view showing the device locked. Fig. 2 is a top plan view showing the device unlocked and the over load actuated spring retracted. Fig. 3 is a longitudinal sectional view taken on line 3—3 of Fig. 1. Fig. 4 is a transverse sectional view taken on line 4—4 of Fig. 1. Fig. 5 is side elevation of the connection applied to the plow or the hauled element.

Referring to the accompanying drawings illustrating the preferred embodiment of the invention 5 denotes a housing in which the overload actuated releasing means are arranged. This housing may be cast or shaped of sheet metal or forged, as experience may deem best. It is formed U-shaped in cross section, with a flat bottom, $5^a$, flat sides $5^b$, at right angles to the bottom $5^a$, and an end wall $5^c$, which is integral with the bottom and the sides.

One end of the housing is open to provide a throat 6, and the adjacent portions of the side walls are formed with arcuate recesses 7 and 8, which provide opposing rigid jaws. The curvature of these jaws is shown to be semi-circular but may be of another curvature. The walls of the recesses 7 and 8 are formed with dovetail recesses 9 in which the lugs 10 of the bushing or wear plates 11 snugly fit, said bushings or wear plates being curved to fit the recesses 7 and 8.

The side walls $5^b$ of the housing 5 are formed with opposing longitudinal grooves or guideways 12, in which the guide lugs 13 of the follower block 14 are slidably disposed. A draft rod or element 15 has its inner end clamped to the block 14 by means of nuts 16, and its outer portion slidable through an opening in the end wall $5^c$ of the housing, in which opening a bushing 17 is fitted, to take up wear. The outer end of the draft rod 15 is formed with an eye 15', which is adapted to enter the usual draw bar head of traction engines and be connected thereto by means of the usual coupling pin. Any other connection between this rod and the tractor may be employed. A contraction spring 18 is disposed around the draft rod 15 and is adapted to withstand normal loads and to be contracted when an abnormal load is placed thereon. This spring bears at one end against the block 14 and at the other end against the end wall $5^c$.

The follower block 14 is formed with openings 14', through which rods 19 and 20 extend. The rear ends of these rods are slidable in the end wall $5^c$, and carry nuts 21, and the forward ends of said rods are secured to the releasing wedge or block 22, which may be shrunk upon the rods or otherwise rigidly secured thereto.

The rods 19 and 20 are provided with contraction springs 23, which abut against burs 24 and which are adjustable by means of nuts 25, threaded upon the rods 19 and 20. The nuts 25 are larger than the openings 14' through which the rods 19 and 20 extend in the follower block 14, so that when the spring 18 is contracted by an overload the block 14 will abut against the nuts 25, thereby contracting the springs 23 and moving the wedge or block 22 inwardly, against the tension of said springs 23.

The above described elements are adapted to be connected directly with the drawbar of the tractor and coöperate with the means adapted to be directly connected with the hauled element, whether it be a plow, a harrow, a cultivator, or any other implement or element. This means will now be described.

26 designates a clevis, formed U-shaped and provided with terminal eyes 26', disposed in opposing relation. Between the eyes 26' the bolts 27 and 28 are disposed, the bolt or member 27 being formed with a single eye 27' and the bolt or member 28 being formed with a pair of opposing eyes 28'. A pin 29, having a rivet head 29' on one end and a cotter pin 29'' on the other, fits in the eyes 26', 27' and 28'', and thus pivotally connects the clevis 26 to the bolts 27 and 28. The outer end of each bolt or member, 27 and 28, is formed with convex enlargement 30 and has an inclined or beveled portion 31. The rounded or convex enlargement 30 is adapted to snugly fit in the concave recess formed by the bushing 11 and the beveled portion 31 is adapted to contact with the beveled or pointed nose 22' of the wedge or block 22.

When it is desired to lock the bolts or members 27 and 28 to the jaws of the housing the noses of said bolts are inserted in the throat of said housing, engaging the nose of the block or wedge 22 and slightly retreating said block or wedge into the housing, thus enabling the convex enlargements 30 of said bolts to fit in the recessed jaws. The bolts are spaced from each other to allow the block or wedge 22 to move between them and when the bolts are inserted in the throat of the housing the springs 23 exerting pressure upon the rods 19 and 20 of the block 22 will force the block 22 outwardly, thus locking the bolts or members in the throat of the housing, by reason of the engagement of the enlargements of said bolts with the jaws of the housing.

The pull upon the bolts 27 and 28 will be taken up by the housing and little pressure exerted upon the block. When the plow or other implement or member with which the bolts are connected meets an obstruction, such as a stump or boulder, or any abnormal resistance, or an over load is placed upon the traction engine by reason of any increased resistance encountered by the hauled plow, harrow, cultivator or other element, the main spring 18 will be contracted beyond the normal load contracting point and the follower block 14 moved into engagement with the nuts 25 on the rods 19 and 20, the block or wedge 22 will be retreated in the housing away from the bolts 27 and 28, which will be thus released from locking engagement with the jaws of the housing, and the coupler will be disrupted.

In the present practice of traction plowing or cultivating no satisfactory means are employed for quickly disconnecting the traction engine from the hauled element, when the hauled element, whether it be a plow, a harrow, a cultivator or other implement, encounters an obstruction so as to relieve the traction engine of the excessive or sudden strain placed upon it by reason of the obstruction encountered. The practical result of accidents of this nature is to injure the traction engine and the plow, or other implement hauled. The present invention satisfactorily and efficiently overcomes this difficulty, by providing a safe overload release, which will effectively disrupt the connection between the traction engine and the plow or element hauled thereby, instantly with the encountering of an obstruction.

In operation the device is completely automatic, so that no accidents are liable through neglect upon the part of the operator of the traction engine. It can be made cheaply and quickly applied to all types of vehicles.

Having described my invention I claim and desire to secure by Letters Patent:—

1. A traction coupling device consisting of a bolt, a housing adapted to interlock with the bolt, and means operable under an overload to unlock the housing from the bolt.

2. A traction coupling consisting of a bolt, a housing interlocking with the bolt, and a spring controlled mechanism in the housing for holding the bolt locked under normal loads and normally inactive spring rods for releasing the bolt under an overload.

3. A traction coupling device consisting of a housing, a pair of bolts, means for holding the bolts locked to the housing under normal loads and means operable under an abnormal load to unlock the bolts.

4. A traction coupling device consisting of a bolt, a housing having a throat to receive the bolt, a jaw in the housing, a sliding block adapted to hold the bolt interlocked with the jaw and means operable by an overload to withdraw the block from the holding position.

5. A traction coupling device consisting of a pair of bolts, a housing, a sliding block adapted to hold the bolts in locked relation with the housing, a spring bolt slidable in the housing, and means coöperating with the spring bolt to withdraw the block from the bolts when an overload is placed on said spring bolt.

6. A coupling device consisting of a housing means having opposing jaws, a pair of bolts adapted to interlock with said jaws, a sliding block adapted to hold the bolts in locked relation with the jaws, a spring bolt slidable in the housing, a follower block connected with the said spring bolt, and means coöperating with the spring bolt and follower block to withdraw the sliding block from the bolts.

7. A coupling device consisting of a housing, a spring mechanism operable therein in the direction of tractive pull, and a pair of bolts interlocking with the housing and the spring mechanism and releasable therefrom when an abnormal load is placed upon said spring mechanism.

8. A coupling device consisting of a housing, a spring actuated mechanism therein, a pair of bolts adapted to oppositely interlock with the housing and held in interlocked relation with said housing by said spring mechanism, and a spring rod adapted to operate the spring mechanism to unlock the bolts from the housing when an overload is placed thereon.

9. A coupling device consisting of a housing, a draft member adapted to be coupled to the housing, and a spring trip member normally holding the housing and draft member coupled and movable in the housing independently of the draft member for uncoupling the draft member from the housing under an overload.

10. A coupling device consisting of a housing, a draft member adapted to be coupled to the housing, a spring draft bar slidable in the housing, and means movable independently of the draft member and the housing and adapted to hold the draft member coupled to the housing and adapted to be moved by the draft bar to release the draft member from coupled position with the housing.

11. A coupling device consisting of a housing, a load carrying spring bar movable in the housing, a spring pressed block in said housing, and draft members adapted to be coupled with the housing and to be held coupled by said spring pressed block.

12. A coupling device consisting of a guiding draft member, a draft member adapted to be coupled thereto, a draft bar slidable on the guiding draft member, and a member slidable in the guiding draft member under the action of the draft bar to uncouple the draft member and the guiding draft member.

13. A coupling device consisting of a guiding draft member, a load carrying spring draft bar movable on the guiding draft member, a second draft member adapted to be coupled to the guiding draft member, and a releasing member movable on the guiding draft member and adapted to disengage the draft member and the guiding draft member when the draft bar is overloaded.

14. In combination, a draft element, a second draft element adapted to be coupled to the first draft element, and a spring block means adapted to hold said draft elements normally coupled and to uncouple said elements when an overload is placed on said draft elements.

15. A coupling device consisting of a supporting member, a draft member adapted to connect with the supporting member, a draft bar slidable on the supporting member, a load sustaining spring on the draft bar and adapted to hold said bar normally inward on the supporting member, a member for holding the draft member coupled to the supporting member, and means movable on the draft bar for withdrawing the member from the holding position to uncouple the draft member from the supporting member.

16. A coupling device consisting of a supporting member, a draft member adapted to be coupled to said supporting member, a draft bar slidable on the supporting member, a load sustaining spring on the draft bar and bearing at one end against the supporting member and at the other against the draft bar to hold said draft bar normally inward, a block for holding the draft member normally coupled to the supporting member, and a spring rod for holding the block in coupling position and provided with an abutment adapted to be engaged by the draft bar to uncouple the draft member from the supporting member.

17. A coupling consisting of a supporting member, a pair of draft members adapted to be coupled to the supporting member, a block movable between the draft members to hold said members coupled to the supporting member, a draft bar, a load sustaining element on the draft bar, and a spring rod connected with the block and slidable through the supporting member and adapted to be actuated by the draft member to disengage the block from coupling position.

18. A coupling consisting of a supporting member, a pair of draft members adapted to be coupled to the supporting member, a spring pressed block carried by the supporting member, said block being adapted to hold the draft members normally coupled to the supporting member, a draft bar slidable on the supporting member, a follower block carried by the draft bar and slidable on the supporting member, a load sustaining spring carried by the draft bar and bearing at one end against the supporting member and at the other end against the draft bar, and spring rods slidable through the follower block to hold the first block in coupling position and provided with abutments engageable by the follower block to move said first block from the coupling position.

19. In combination, companion draft elements, a draft element adapted to be coupled to the companion draft elements, and means including a spring pressed wedge for holding the draft element and the companion draft elements coupled under ordinary loads.

20. In combination, a draft element, companion draft elements pivoted to each other and adapted to couple with the draft element, means movable between the companion draft elements for holding the same coupled to the draft element, and an overload trip movable to release the means.

21. In combination, a member having a coupling recess, a spring pressed member adjacent said recess, an element adapted to fit in the recess and to displace the spring pressed member from its normal position to enter the recess, and an overload trip for the element.

22. In combination, a housing having a throat and an arcuate jaw, a member projecting into the throat and disposed opposite to the jaw, a draft member adapted to displace the second member and having coupling engagement with the jaw, and means operable under an overload to withdraw the second member to permit the draft member to uncouple from the housing.

23. In combination, a housing having a throat and an arcuate jaw on each side of the throat, a coupling element having laterally enlarged portions adapted to have a coupling engagement with the arcuate jaws, and a spring pressed means for holding the coupling element in coupling engagement with the jaws.

24. In combination, members adapted to be coupled to each other, a spring pressed block for holding the members coupled to each other and adapted to be displaced during the operation of coupling the members to each other, and means for uncoupling the members under an overload.

25. In combination, members adapted to be coupled to each other, a spring pressed block for holding the members coupled to each other and adapted to be displaced during the operation of coupling the members to each other, and an overload spring means for uncoupling the members.

26. In combination, a draft member having an arcuate jaw on one side thereof, a block slidable on the draft member, a draft bar connected with the block and slidable through one end of the draft member, a load spring located between the block and said end of the draft member, a pair of bolts having loose hinge connection and formed with convex terminal enlargements adapted to interlock with the arcuate jaws of the draft member, a wedge slidable between the bolts to hold said bolts interlocked with the arcuate jaws, a rod connected with the wedge and slidable through the draft member and extended through the block, a nut on said rod forming an abutment for the block, and a spring on said rod bearing against the draft member at one end and against the nut at the other end, said block being adapted to abut against the nut to move said rod to withdraw the wedge from between the bolts when the load spring receives an overload.

27. An overload uncoupling coupler consisting of a draft member, a block slidable on the draft member, a draft bar connected to the block and slidable through one end of the draft member, a load spring between the block and said end of the draft member, a wedge, a rod secured to the wedge and slidably extended through the block and through said end of the draft member, a spring on said rod bearing at one end against the draft member, a nut on said rod forming an adjustable stop for the spring, opposing jaws on the draft member, said wedge being normally held by said rod springs between the jaws, and a pair of pivoted bolts adapted to interlock with the jaws and be separated from each other to interlock with said jaws under the action of said wedge, said rod spring being considerably weaker than the load spring, whereby easy coupling is permitted, and said block being adapted to engage the nut on said rod to withdraw the wedge from between the bolts.

In testimony whereof I affix my signature in presence of two witnesses.

LOUIS ARTHUR WESTIN.

Witnesses:
E. C. CATTS,
S. W. COCKRELL.